US008081606B2

(12) United States Patent
Cai et al.

(10) Patent No.: US 8,081,606 B2
(45) Date of Patent: Dec. 20, 2011

(54) METHOD AND APPARATUS FOR ALLOCATION OF AN UPLINK RESOURCE

(75) Inventors: Zhijun Cai, Euless, TX (US); James Earl Womack, Bedford, TX (US); Yi Yu, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 963 days.

(21) Appl. No.: 12/023,897

(22) Filed: Jan. 31, 2008

(65) Prior Publication Data

US 2009/0196236 A1    Aug. 6, 2009

(51) Int. Cl.
    *H04J 3/00* (2006.01)
(52) U.S. Cl. ........................................... 370/336
(58) Field of Classification Search .................. None
    See application file for complete search history.

(56) References Cited

U.S. PATENT DOCUMENTS

| 7,869,461 | B2 * | 1/2011 | Lohr et al. ................... 370/469 |
| 2005/0002366 | A1 | 1/2005 | Toskala et al. |
| 2005/0047425 | A1 | 3/2005 | Liu et al. |
| 2005/0073985 | A1 | 4/2005 | Heo et al. |
| 2006/0035643 | A1 | 2/2006 | Vook et al. |
| 2007/0110002 | A1 | 5/2007 | Yang et al. |
| 2008/0051125 | A1 | 2/2008 | Muharemovic et al. |
| 2008/0080472 | A1 | 4/2008 | Bertrand et al. |
| 2009/0109908 | A1 | 4/2009 | Bertrand et al. |

FOREIGN PATENT DOCUMENTS

| EP | 1858210 A1 | 11/2007 |
| KR | 20060016427 A | 2/2006 |
| WO | 03051007 A1 | 6/2003 |
| WO | 2006019267 A1 | 2/2006 |
| WO | 2007059201 A2 | 5/2007 |

OTHER PUBLICATIONS

European Search and Examination Report; Application No. 08153860.5; Jan. 27, 2011; 5 pgs.
3GPP TSG RAN WG1 #52; Sounding Reference Signal In Support of Scheduling Request in E-UTRA; R1080700; Texas Instruments; Sorrento, Italy; Feb. 11-15, 2008; 7 pgs.
European Extended Search Report; EP Application No. 08153672; Feb. 25, 2009; 9 pgs.
PCT International Search Report; PCT Application No. PCT/US2009/032436; Sep. 14, 2009; 4 pgs.
PCT Written Opinion of the International Searching Authority; PCT Application No. PCT/US2009/032436; Sep. 14, 2009; 6 pgs.
Partial European Search Report; EP Application No. 08153672.4; Research in Motion Limited; Jul. 17, 2008; 4 pgs.

(Continued)

*Primary Examiner* — Raj Jain
(74) *Attorney, Agent, or Firm* — Conley Rose, P.C.; J. Robert Brown, Jr.

(57) ABSTRACT

A component in a telecommunications network including a processor configured, responsive to receiving a scheduling request from a user equipment (UE), to grant a minimum level of resource capacity to the UE for an uplink transmission from the UE to the component. The processor further configured to determine the minimum level of resource capacity based on an expected data packet payload and on a condition of a communications channel between the component and the UE.

19 Claims, 6 Drawing Sheets

OTHER PUBLICATIONS

3rd Generation Partnership Project; Technical Specification Group Radio Access Network; Title: Evolved Universal Terrestrial Radio Access (E-UTRA) Medium Access Control (MAC) Protocol Specification; Release 8; 3GPP TS 36.321 v8.1.0; Mar. 2008; 30 pgs.

Cai, Zhijun, et al.; U.S. Appl. No. 12/052,893; Title: Providing A Time Offset Between Scheduling Request and Sounding Reference Symbol Transmissions; Filing Date: Mar. 21, 2008.

3GPP TSG RAN WG1 #51; LG Electronics, Inc.; Title: "Scheduling Request (SR) Interaction with PUCCH"; R1-074739; Jeju, Korea; Nov. 5-9, 2007; 5 pgs.

3GPP TSG RAN WG1 Meeting #51; NTT DoCoMo, KDDI, Sharp; Title: Multiplexing Scheme for Sounding RS in E-UTRA Uplink; R1-074808; Jeju, Korea; Nov. 5-9, 2007; 3 pgs.

3GPP TS 36.321 V8.2.0; 3rd Generation Partnership Project; Technical Specification Group Radio Access Network; Evolved Universal Terrestrial Radio Access (E-UTRA) Medium Access Control (MAC) Protocol Specification; Release 8; May 2008; 33 pgs.

Ghosh, Amitava, et al.; Title: "Uplink Control Channel Design for 3GPP LTE"; IEEE International Symposium on Personal, Indoor and Mobile Radio Communcations (PIMRC'07); Sep. 1, 2007; 5 pgs.

European Search and Examination Report; EP Application No. 08153860.5; Jun. 18, 2008; 9 pgs.

PCT International Preliminary Report on Patentability; PCT Application No. PCT/US2009/032436; May 24, 2010; 6 pgs.

Office Action dated Apr. 13, 2011; U.S. Appl. No. 12/052,893, filed Mar. 21, 2008; 21 pages.

European Extended Search Report; Application No. 11183791.0; Oct. 25, 2011; 5 pages.

Final Office Action dated Oct. 7, 2011; U.S. Appl. No. 12/052,893; Filed Mar. 21, 2008; 24 pages.

European Examination Report; EP Application No. 08153672.4; Aug. 9, 2011; 4 pages.

* cited by examiner

METHOD AND APPARATUS FOR ALLOCATION OF AN UPLINK RESOURCE

BACKGROUND

Easily transportable devices with wireless telecommunications capabilities, such as mobile telephones, personal digital assistants, handheld computers, and similar devices, will be referred to herein as user equipment (UE). The term "user equipment" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. A UE might communicate with a second UE, some other element in a telecommunications network, an automated computing device such as a server computer, or some other device. A communications connection between a UE and another component might promote a voice call, a file transfer, or some other type of data exchange, any of which can be referred to as a call or a session.

As telecommunications technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers. Voice over Internet Protocol (VoIP) is a well-known system for packet switched-based voice communication over the Internet. The term "VoIP" will refer herein to any packet switched voice call connected via the Internet, regardless of the specific technology that might be used to make the call.

For a wireless VoIP call, the signal that carries data between a UE and an ENB can have a specific set of frequency, code, and time parameters and other characteristics that might be specified by the ENB. A connection between a UE and an ENB that has a specific set of such characteristics can be referred to as a resource. An ENB typically establishes a different resource for each UE with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
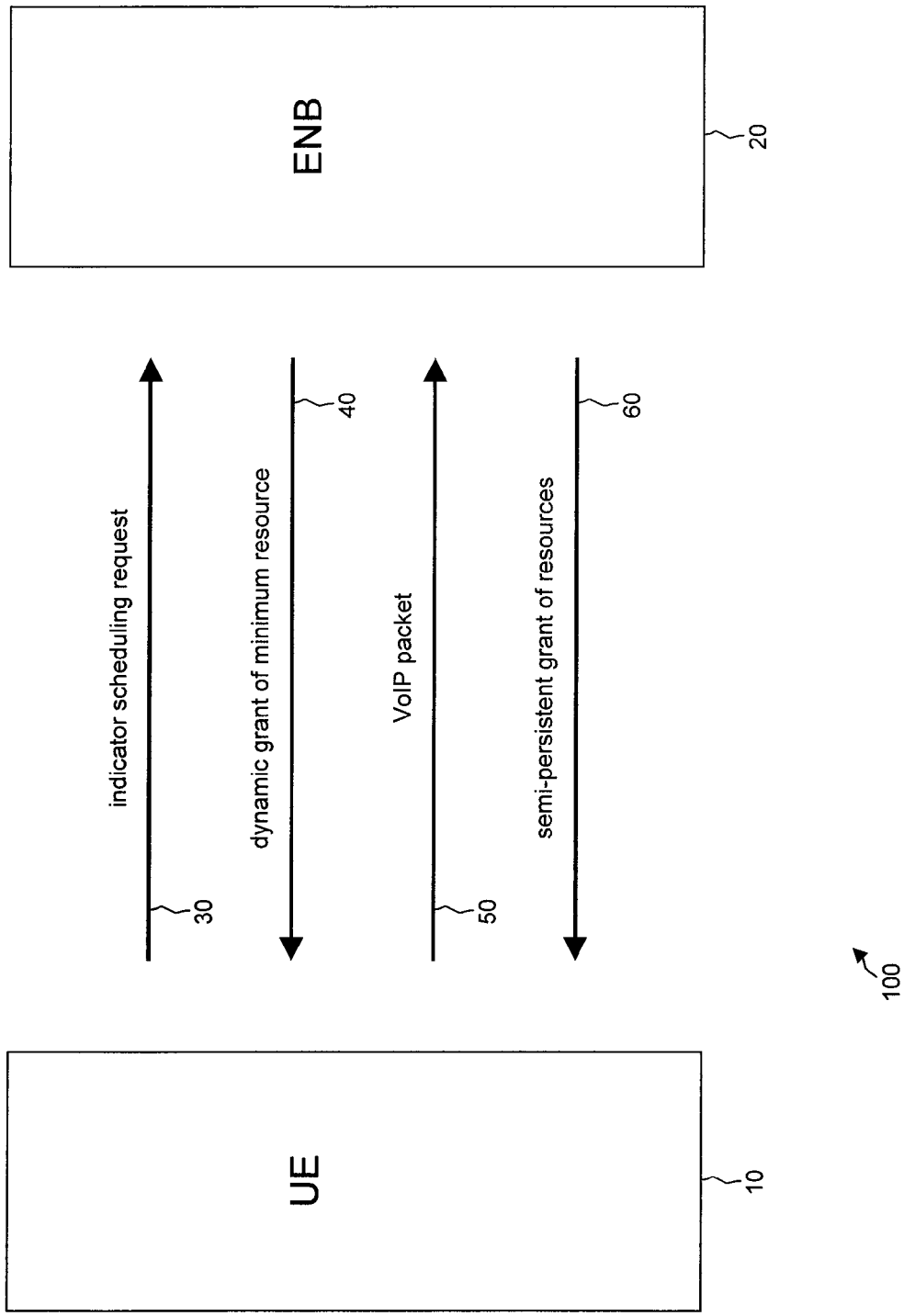
FIG. 1 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a component in a telecommunications network is provided that includes a processor configured, responsive to receiving a scheduling request from a user equipment (UE), to grant a minimum level of resource capacity to the UE for an uplink transmission from the UE to the component. The processor further configured to determine the minimum level of resource capacity based on an expected data packet payload and on a condition of a communications channel between the component and the UE.

In another embodiment, a user equipment (UE) is provided that includes a processor to promote communication of a scheduling request to an enhanced node B and to receive from the enhanced node B a grant of a minimum level of resource capacity for an uplink to the enhanced node B. The minimum level of resource capacity based on an expected data packet payload and on a condition of a communications channel between the enhanced node B and the UE. The processor configured to promote use of the grant of the minimum level of resource capacity to send the enhanced node B a data packet that is a VoIP data packet or a buffer status report.

In an embodiment, a method is provided for establishing an uplink resource for a Voice over Internet Protocol (VoIP) call. The method includes sending a scheduling request for the uplink resource, and receiving from the uplink resource a grant of a minimum resource. The method includes sending a VoIP data packet, and receiving a grant from the uplink resource of a semi-persistent resource with a capacity substantially similar to a capacity of the minimum resource.

In another embodiment, a method is provided for establishing an uplink resource for a Voice over Internet Protocol (VoIP) call. The method includes receiving a scheduling request for the uplink resource, and granting a minimum resource. The method includes receiving a VoIP data packet, and responsive to receiving the VoIP data packet, granting a semi-persistent resource with a capacity substantially similar to a capacity of the minimum resource.

There can be periods of silence in a VoIP call during which no voice-based data packets are transmitted between a UE and an ENB. For example, if a first party in a call pauses in the course of a conversation, a silent period might occur in the uplink from that party's UE to the ENB until that party resumes talking. Similarly, a silent period might occur in the downlink from the ENB to the UE of the second party in the conversation until the first party resumes talking. When a silent period occurs in a call, the resources that were carrying the call might be released for use by other calls.

The resumption of the transmission of voice-based data packets from the UE to the ENB at the end of a silent period can be referred to as a talk spurt. If a call's resource is released at the beginning of a silent period, an uplink resource typically needs to be reestablished from the UE to the ENB when a talk spurt occurs. Considerations regarding the re-establishment of an uplink resource upon the occurrence of a talk spurt could also apply to the situation where an uplink resource is first established.

Traditionally, a four-step process is followed in allocating an uplink resource to a UE so that the UE can initiate a data transmission to the ENB or resume a VoIP call when a talk spurt occurs. In the first step, the UE sends an indicator, which in some embodiments might be a single data bit and in others the indicator may include two or more data bits, to the ENB over a scheduling request channel. The scheduling request channel is a dedicated channel between the UE and the ENB that is traditionally established specifically for the purpose of providing the UE a channel for requesting resources from the ENB. When the UE places an indicator on the scheduling request channel, the ENB interprets this as a request for resources.

In the second step of the traditional resource allocation process, upon receiving the indicator from the UE, the ENB assigns the UE only a small amount of resource capacity. In the third step, the UE uses this limited resource capacity to send the ENB a buffer status report that informs the ENB of the quantity of data the UE wishes to send as well as other information such as QoS (Quality of Service) information. The ENB uses this information to determine the quantity of resource capacity the UE will need. In the fourth step, the ENB allocates to the UE the amount of resource capacity appropriate for the data quantity and any QoS or other requirement or considerations specified in the buffer status report.

When this procedure of determining resource capacity one time and then periodically allocating substantially the same resource capacity is followed (the allocation is implicit without using additional allocation signaling), a call can be said to use semi-persistent scheduling. If multiple resource requests are made and a different resource capacity might be allocated for each request and the allocation is only valid for one request (not periodically allocated), a call can be said to employ dynamic scheduling.

In an embodiment, the present disclosure provides a modification to the traditional, four-step, semi-persistent resource allocation procedure. A first step of a UE sending the indicator scheduling request to an ENB is followed as described above. In a second step, the ENB allocates a minimum resource based on a minimum payload for a compressed VoIP data packet and on the current channel conditions. In a third step, if the call is a VoIP call, the UE uses the minimum resource to send the ENB a first VoIP data packet. If the call is not a VoIP call, the UE uses the minimum resource to send the ENB a buffer status report in the traditional manner. In a fourth step, upon receiving a data packet from the UE via the minimum resource, the ENB determines whether the data packet is associated with a VoIP call. If the data packet is associated with a VoIP call, the ENB employs semi-persistent scheduling to assign resources for further packets from the UE that are of substantially the same capacity as the minimum resource. If the data packet is not associated with a VoIP call, the ENB uses the buffer status report to assign resources of an appropriate capacity in the traditional manner.

FIG. 1 illustrates an embodiment of a system 100 for allocating uplink resources. A UE 10 is capable of communicating with an ENB 20 or a similar component. When the UE 10 wishes to establish a new uplink resource with the ENB 20 or re-establish an uplink resource when a talk spurt occurs, the UE 10 sends an indicator scheduling request 30 to the ENB 20. Upon receiving this indicator, the ENB 20 makes a dynamic grant of a minimum resource 40 to the UE 10. The minimum resource 40 is of sufficient capacity to handle a VoIP packet or other data packet that the UE 10 is anticipated to send to the ENB 20.

The ENB 20 then determines the size of the minimum resource 40 based on the expected data packet payload, which may be based on the size of a typical compressed VoIP payload and on the channel conditions that may currently exist between the UE 10 and the ENB 20. For example, if Robust Header Compression (ROHC) or a similar compression technique is used, the size of a VoIP payload can be reduced to about 35 to 40 bytes, which might occupy about four to five resource blocks depending on the modulation and coding used. Under certain channel conditions, approximately four to five resource blocks might be assigned as the minimum resource 40. When channel conditions are poor, a greater number of resource blocks might be assigned as the minimum resource 40. According to one embodiment, the UE 10 may send a channel quality indicator (CQI) to the ENB 20 that provides channel condition information.

Upon receiving this grant of the minimum resource 40, the UE 10 may send a VoIP packet 50 to the ENB 20. The VoIP packet 50 indicates the beginning of a talk spurt. The ENB 20, using standard techniques, can determine that the received packet is a VoIP-based packet. Upon making this determination, the ENB 20 can make a semi-persistent grant 60 of resources to the UE 10 for future VoIP packets that the UE 10 wishes to send. That is, if the size of the minimum resource 40 was sufficient to allow successful transmission of the VoIP packet 50 to the ENB 20, the ENB 20 can periodically grant resources of substantially the same size to the UE 10 for subsequent VoIP packets (the allocation is implicit without using additional allocation signaling).

Due to poor channel conditions or other factors (for example, the VoIP packet is uncompressed), the minimum resource 40 allocated by the ENB 20 may not be large enough to successfully carry the VoIP packet 50. It can be assumed in such a case that if resources of a similar capacity were granted in the semi-persistent grant 60 of resources, the resources would be insufficient to successfully carry out the call. When the resource is not enough to carry the VoIP packet 50, the UE 10 may send a buffer status report to the ENB 20 instead of the VoIP packets, therefore the ENB 20 can allocate a larger minimum resource to the UE 10, and the UE 10 can attempt to send the VoIP packet 50 using this larger minimum resource. It is anticipated that the delay caused by such a retransmission of the VoIP packet 50 will not significantly affect buffering schemes.

In some cases, such as web browsing and sending email, a call might involve the UE 10 sending data other than VoIP data to the ENB 20. In such cases, the transfer of information between the UE 10 and the ENB 20 might occur differently from the above description. The UE 10 would still send the indicator scheduling request 30 to the ENB 20 and the ENB 20 would still make the dynamic grant of the minimum resource 40 as described above. The ENB 20 does not know at this point whether the scheduling request 30 is related to a VoIP request or to a data request, but the ENB 20 allocates the minimum resource 40 for a VoIP call to handle the possibility that the request 30 is related to a VoIP call. This minimum resource size must be sufficient for the UE 10 to send a buffer status report in the traditional manner. In this way, the ENB 20 allocates sufficient resources for any size data packet that the UE 10 is anticipated to send in the next step of the uplink transmission.

If the UE 10 sends the VoIP packet 50, the ENB 20 establishes semi-persistent scheduling for a VoIP call based on the size of the grant of the minimum resource 40 as described above. If the call is not a VoIP call, the UE 10 uses the minimum resource 40 to send a buffer status report describing the data packets that the UE 10 wishes to send. In such a case, the ENB 20 recognizes that the packet is not a VoIP packet and establishes dynamic scheduling in the traditional manner based on the information in the buffer status report.

Figure 2:
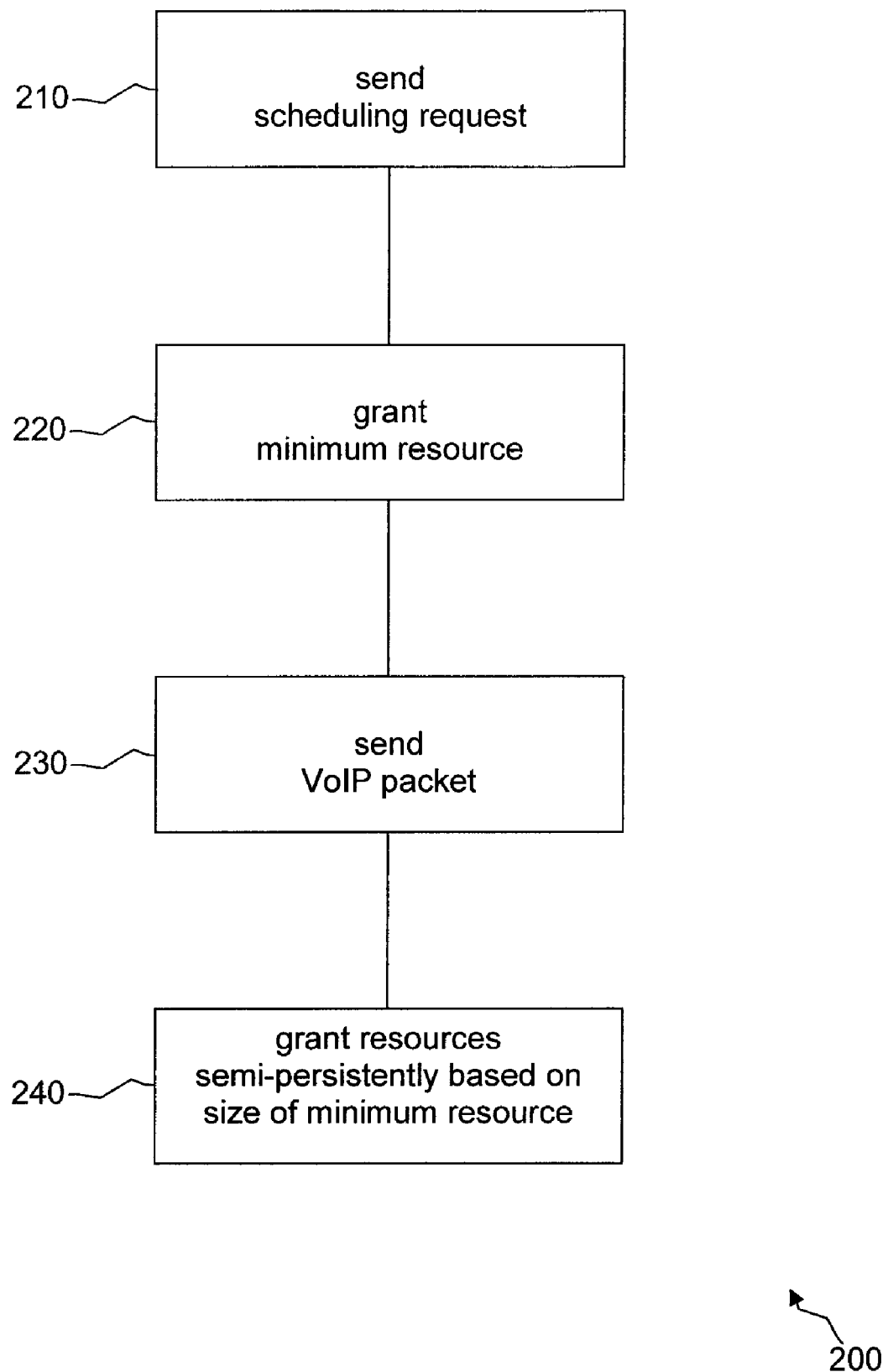
FIG. 2 is a diagram of a method for establishing an uplink resource for a Voice over Internet Protocol call according to an embodiment of the disclosure.

FIG. 2 illustrates an embodiment of a method 200 for establishing an uplink resource for a VoIP call. At block 210, a scheduling request is sent from a UE to an ENB. At block 220, a resource with the minimum capacity to handle a VoIP packet is granted. This minimum resource capacity might be based on the expected data packet payload, such as the minimum size of a compressed VoIP payload and considering the current channel conditions. The ENB might determine the minimum resource capacity upon receiving the scheduling request and then grant the minimum resource, or the ENB might determine the minimum resource capacity prior to receiving the scheduling request and grant the minimum resource after receiving the scheduling request.

At block 230, the UE sends a VoIP packet to the ENB. The ENB has the capability to examine the packet and determine that the packet is part of a VoIP call. Upon making such a determination, the ENB, at block 240, establishes semi-persistent scheduling for the uplink based on the resource size that was used for the minimum resource grant at block 220.

Figure 3:
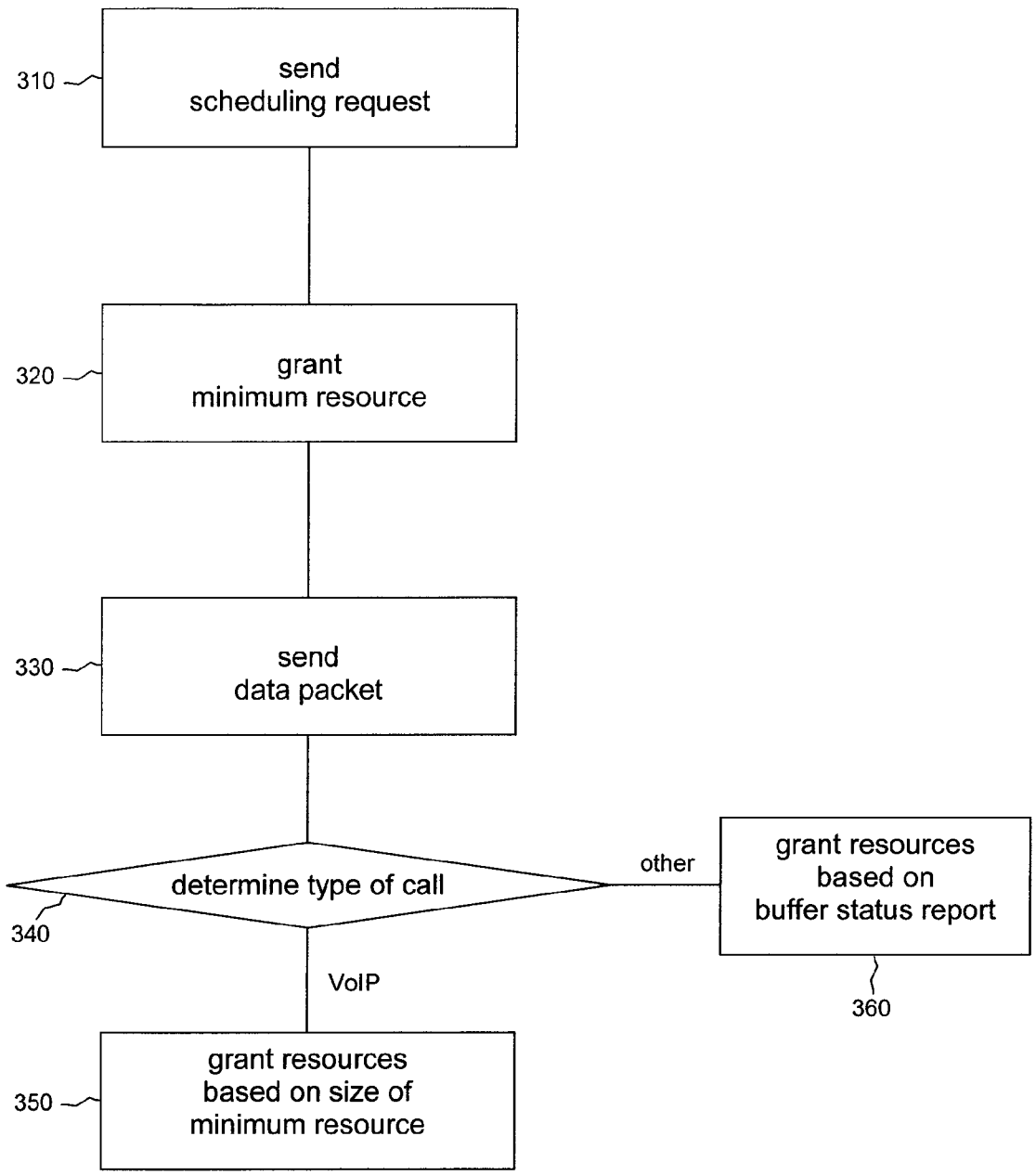
FIG. 3 is a diagram of a method for establishing an uplink resource according to an embodiment of the disclosure.

FIG. 3 illustrates an embodiment of a method 300 for establishing an uplink resource. At block 310, a scheduling request is sent from a UE to an ENB. At block 320, a resource with the minimum capacity to handle a VoIP packet is granted. At block 330, the UE sends a data packet to the ENB. The data packet is a VoIP packet in the case of a VoIP transmission and otherwise contains a buffer status report. The ENB has the capability to determine whether packet is a VoIP packet or a different type of packet and can take different actions based on this determination. The ENB makes such a determination at block 340. If the packet is a VoIP packet, the action at block 350 is performed and the ENB establishes semi-persistent scheduling for the uplink using the resource size that was used for the minimum resource grant at block 320. If the packet is not a VoIP packet, the action at block 360 is performed and the ENB establishes dynamic scheduling for the uplink based on the information in the buffer status report.

Figure 4:
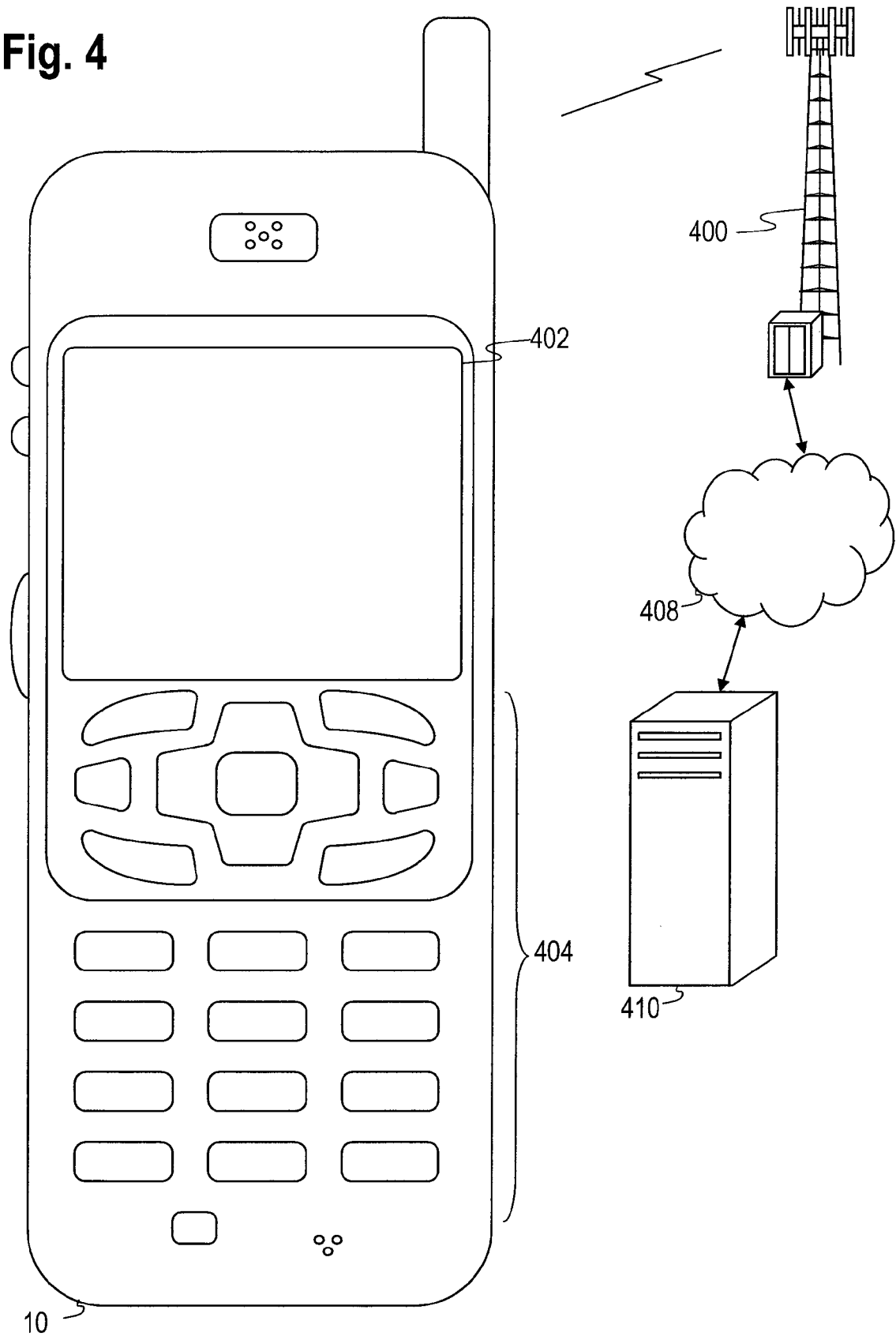
FIG. 4 is a diagram of a wireless communications system including a user equipment operable for some of the various embodiments of the disclosure.

FIG. 4 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 5:
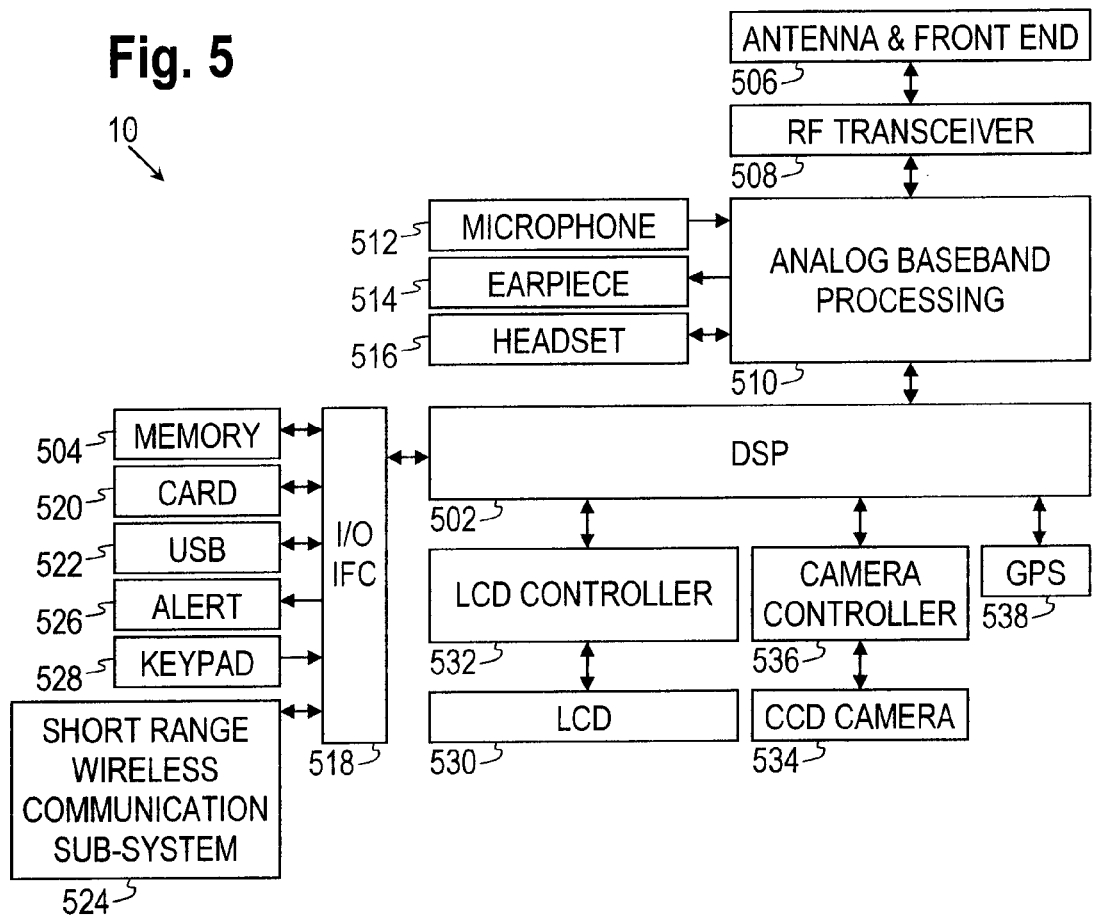
FIG. 5 is a block diagram of a user equipment operable for some of the various embodiments of the disclosure.

FIG. 5 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 6:
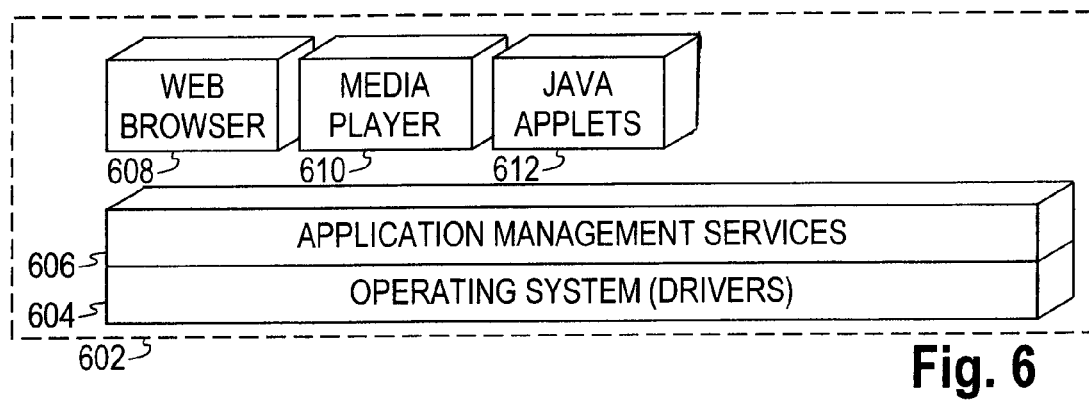
FIG. 6 is a diagram of a software environment that may be implemented on a user equipment operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 6 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality.

Figure 7:
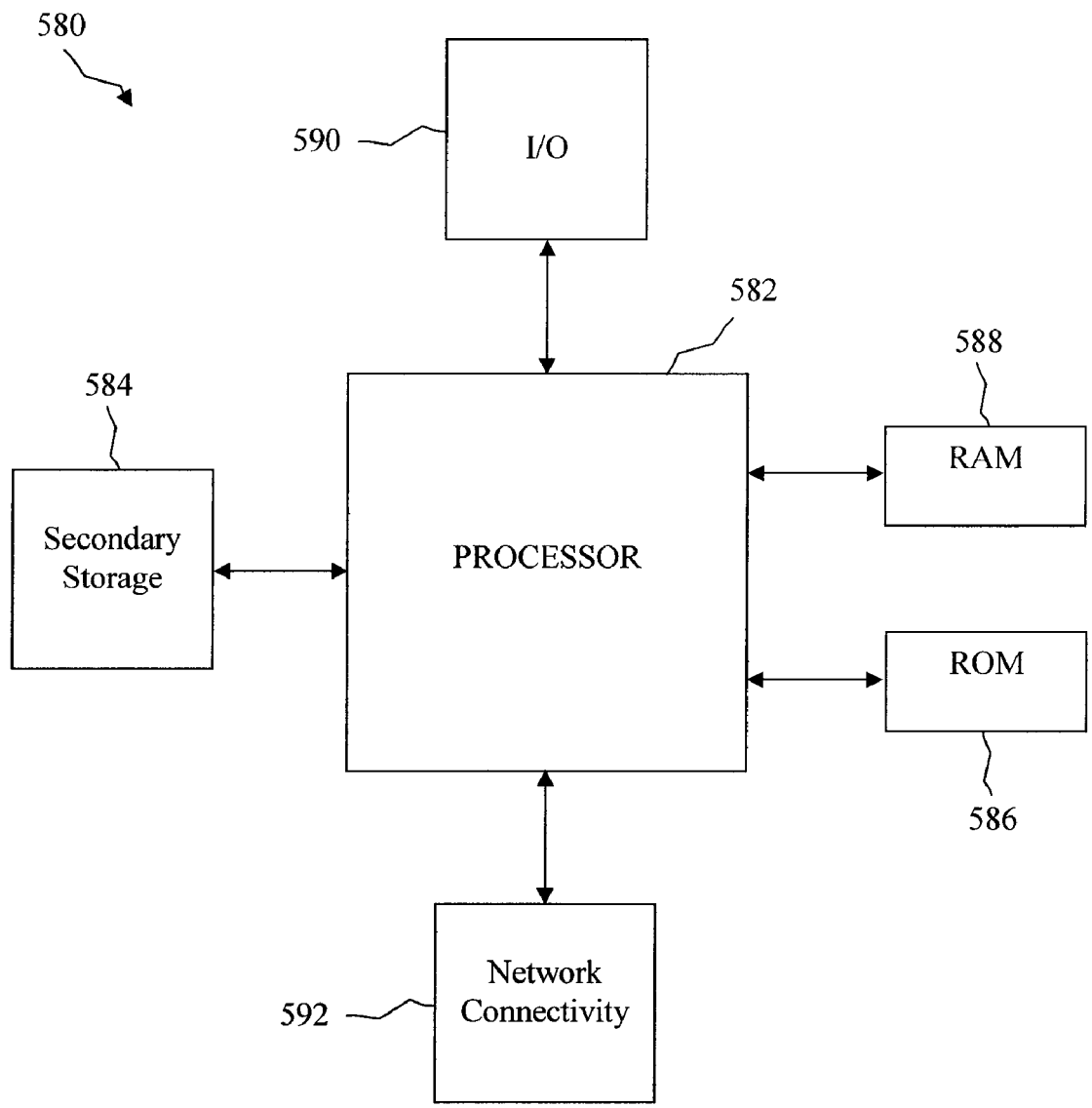
FIG. 7 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave. The network connectivity devices 592 may also include one or more transmitter and receivers for wirelessly or otherwise transmitting and receiving signal as are well know to one of ordinary skill in the art.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A component in a telecommunications network, comprising:
    a processor configured, responsive to receiving a scheduling request from a user equipment (UE), to grant a minimum level of resource capacity to the UE for an uplink transmission from the UE to the component, the processor further configured to determine the minimum level of resource capacity based on an expected data packet payload and on a condition of a communications channel between the component and the UE.

2. The component of claim 1 wherein the processor further configured to determine the minimum level of resource capacity based on the expected data packet payload and on the condition of a communications channel between the component and the UE, the expected data packet payload size is a Compressed VoIP packet size.

3. The component of claim 1 wherein the component configured to receive from the UE, responsive to the UE receiving the grant of the minimum level of resource capacity to send the component, a data packet that is one of:
   a VoIP data packet; or
   a buffer status report.

4. The component of claim 3 wherein, when the data packet is the VoIP data packet, the component allocates a semi-persistent resource.

5. The component of claim 3 wherein, when the data packet is the buffer status report, the component allocates a dynamic resource.

6. The component of claim 3 wherein, when the data packet is not received successfully, the minimum level of resource capacity is increased and the data packet is transmitted via the increased-capacity resource.

7. The component of claim 1, wherein the component is an enhanced node B.

8. A user equipment (UE), comprising:
   a processor to promote communication of a scheduling request to an enhanced node B and to receive from the enhanced node B a grant of a minimum level of resource capacity for an uplink to the enhanced node B, the minimum level of resource capacity based on an expected data packet payload and on a condition of a communications channel between the enhanced node B and the UE, the processor configured to promote use of the grant of the minimum level of resource capacity to send the enhanced node B a data packet that is one of:
   a VoIP data packet, or
   a buffer status report.

9. The UE of claim 8 wherein the minimum level of resource capacity based on the expected data packet payload and on the condition of a communications channel between the enhanced node B and the UE, the expected data packet payload size is a Compressed VoIP packet size.

10. The UE of claim 8 wherein, when the data packet is the VoIP data packet, the UE configured to receive from the enhanced node B a semi-persistent resource allocated to the UE.

11. The UE of claim 8 wherein, when the data packet is the buffer status report, the UE configured to receive from the enhanced node B a dynamic resource allocated to the UE.

12. A method for establishing an uplink resource for a Voice over Internet Protocol (VoIP) call comprising:
   sending a scheduling request for the uplink resource;
   receiving from the uplink resource a grant of a minimum resource;
   sending a VoIP data packet; and
   receiving a grant from the uplink resource of a semi-persistent resource with a capacity substantially similar to a capacity of the minimum resource.

13. The method of claim 12 wherein the capacity of the minimum resource is determined based on a minimum size of a compressed VoIP payload and on a condition of a communications channel between a first component sending the scheduling request and a second component where the grant of the minimum resource is received from.

14. The method of claim 13 wherein the first component is a user equipment.

15. The method of claim 12 wherein, when the VoIP data packet is not received successfully, the capacity of the minimum resource is increased and the VoIP data packet is transmitted via the increased-capacity minimum resource.

16. A method for establishing an uplink resource for a Voice over Internet Protocol (VoIP) call comprising:
   receiving a scheduling request for the uplink resource;
   granting a minimum resource;
   receiving a VoIP data packet; and
   responsive to receiving the VoIP data packet, granting a semi-persistent resource with a capacity substantially similar to a capacity of the minimum resource.

17. The method of claim 16 wherein the capacity of the minimum resource is determined based on a minimum size of a compressed VoIP payload and on a condition of a communications channel between a first component where the scheduling request is received from and a second component granting the minimum resource.

18. The method of claim 17 wherein the second component is an enhanced node B.

19. The method of claim 16 wherein, when the VoIP data packet is not received successfully, the capacity of the minimum resource is increased and the VoIP data packet is transmitted via the increased-capacity minimum resource.

* * * * *